United States Patent [19]

Van Hille

[11] 4,020,956

[45] May 3, 1977

[54] LIVE BOTTOM PIT FOR A SOLID WASTE DISPOSAL SYSTEM

[76] Inventor: Herman Van Hille, 130 Sharene Lane, Apt. 10, Walnut Creek, Calif. 94596

[22] Filed: July 18, 1975

[21] Appl. No.: 592,490

[52] U.S. Cl. .......................... 214/17 DA; 110/8 R; 198/708

[51] Int. Cl.² ........................................ B65G 65/44

[58] Field of Search ............ 214/17 R, 17 D, 17 A, 214/17 DA, 18.24, 19, 23–26, 35 R; 198/137, 149, 196, 198, 199, 202, 203, 233; 110/8 R; 404/6, 7, 9, 11; 256/13.1; 340/61, 70

[56] References Cited

UNITED STATES PATENTS

| | | | |
|---|---|---|---|
| 1,405,571 | 2/1922 | Davis | 198/198 |
| 1,969,845 | 8/1934 | Hick | 404/9 |
| 2,416,634 | 2/1947 | McBride | 198/149 |
| 2,947,408 | 8/1960 | Fowler | 198/198 |
| 3,504,645 | 4/1970 | Davenport | 110/8 R |
| 3,664,278 | 5/1972 | Steen | 110/8 R |
| 3,687,094 | 8/1972 | Menigat | 110/8 R |
| 3,713,402 | 1/1973 | Ahrend | 110/8 R |
| 3,869,574 | 3/1975 | Kume | 198/203 |
| 3,891,099 | 6/1975 | Smith | 214/17 DA |

*Primary Examiner*—Trygve M. Blix
*Assistant Examiner*—Jesus D. Sotelo
*Attorney, Agent, or Firm*—Steele & Petock

[57] ABSTRACT

A live bottom pit for a solid waste disposal system is disclosed in which an endless device or endless belt-like structure driven by a motor is positioned near the bottom of the pit and extends upward along one side of the pit at an angle in excess of 35 degrees. A plurality of the endless belt-like structure may be provided to cover the entire bottom of the pit. The endless belt-like structure is comprised of a plurality of plates pivotally joined together. The plates are provided with projecting members which slice through a solid waste mass piled thereon. The solid waste is piled to a substantial height on the live bottom. A layer of solid waste is fed from the bottom of the mass of solid waste. Material from the rear of the mass of solid waste is fed first by the endless belt-like structure. The material being piled to a substantial height and the feeding action of the endless belt-like structure causes the mass of solid waste to become packed thereby allowing the pit to hold more solid waste material. Furthermore, the action of the live bottom device causes the solid waste material to be broken up as it is fed for further processing.

22 Claims, 18 Drawing Figures

LIVE BOTTOM PIT FOR A SOLID WASTE DISPOSAL SYSTEM

The purpose of the above abstract is to provide a non-legal technical statement of the disclosure of the contents of the instant patent application and thus serve as a searching-scanning tool for scientists, engineers and researchers. Accordingly, this abstract is not intended to be used in understanding or otherwise comprehending the principles of the present invention hereinafter described in detail, nor is it intended to be used in interpreting or in any way limiting the scope or fair meaning of the claims appended hereto.

BACKGROUND OF THE INVENTION

The present invention relates to a live bottom pit for solid waste disposal systems. More particularly, the present invention relates to a live bottom pit for solid waste disposal systems in which a layer of solid waste material is fed from the bottom of a mass of solid waste.

One of the most serious problems confronting the people of the world is the disposal of solid waste, such as trash and garbage. In the past, various methods and systems of burying the trash in layers have been used. It has also been known in the prior art to burn the trash in furnaces. The present invention is directed to the structure of a live bottom pit for use in a plant for burning solid waste, such as trash and garbage, to generate steam without causing air or water pollution. The steam of the plant may be used for various purposes, such as heating and the generation of electricity.

DESCRIPTION OF THE PRIOR ART

Various types of plants for burning solid waste, such as trash and garbage, are known. U.S. Pat. No. 3,647,405 — Smith discloses a garbage incinerator in which garbage is dumped to a substantial height onto an endless belt or conveyor belt which moves the garbage as a mass into a face of rotating shredders. The conveyor belt is mounted only along the bottom of the pit. The conveyor belt in the Smith patent moves the entire mass and performs no shredding action on a relatively small layer or portion of the material being fed for burning from the bottom of the mass of solid waste.

U.S. Pat. No. 3,687,094 — Menigat discloses an incinerator for burning waste and refuse wherein the waste is dumped onto an inclined conveyor. The inclined conveyor feeds the material for further processing. The Menigat patent is directed to incinerators for municipalities of small or moderate size. The conveyor disclosed in the Menigat patent is used for feeding only. It is well known that a conveyor will not feed an an angle in excess of 32°. The conveyor of the Menigat patent feeds the refuse to a plurality of rotating grate rollers.

U.S. Pat. No. 3,664,278 — Steen discloses an apparatus for incinerating materials in which the material is dumped into a combination burning and storage pit. A ramp structure is disclosed on one or both sides of the pit to enable the discharge of vehicles more closely to the center of the pit. However, the Steen patent does not disclose the live bottom structure nor the dust and dirt retaining structure of the present invention.

It has also been known in the prior art to use rotary guard rails. For example, U.S. Pat. No. 1,969,845 discloses a rotary guard rail which prevents swirving vehicles on a highway from leaving the roadway and enables the deflection of such vehicles back into the traffic lane.

SUMMARY OF THE INVENTION

An advantage of the present invention is that it provides a pit for a solid waste disposal system which is capable of holding a larger quantity of solid waste in a given space. It is possible to dump large amounts of solid waste on the live bottom because the live bottom carries away or moves just the right amount of material from the bottom. Only a layer on the bottom, which corresponds to a metered amount, is removed from the mass of solid waste material in the pit.

Another advantage of the present invention is that the live bottom structure is self cleaning due to the scraping action of the live bottom structure against the mass of material. This is contrary to a conveyor type structure which would not be scraped by the solid waste material but the solid waste material carried by the conveyor.

A still further advantage of the present invention is that the action of the live bottom on the bottom layer of solid waste material is to break up the waste materials in the bottom layer due to the action of the live bottom. In other words, pieces of furniture, glass and other similar items in the solid waste mass are broken up by the action of the live bottom structure.

Briefly, in accordance with the present invention, a pit for the collection of solid waste in a solid waste disposal system is provided. The pit includes endless means positioned in a substantially horizontal position near at least a portion of the bottom of said pit and extends upward at an angle in excess of 35 degrees at one side of the pit. Means is provided for driving the endless means whereby a layer of solid waste adjacent the endless means may be removed from the bottom of a mass of solid waste in the pit.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF THE PREFERRED EMBODIMENTS

Figure 15:
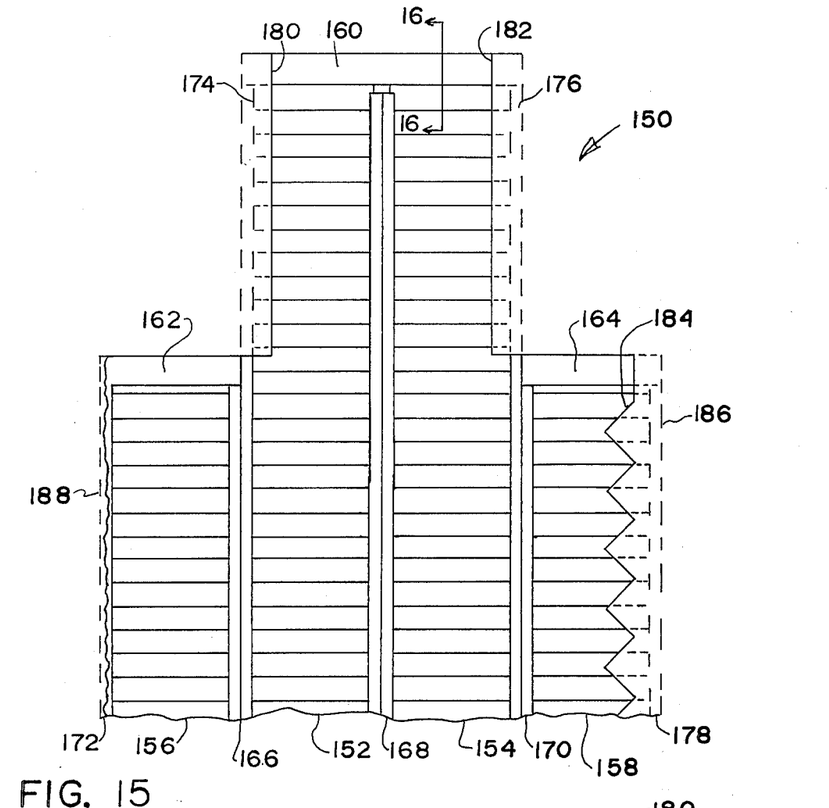
FIG. 15 is a partial plan diagramatic view of an alternate embodiment of a live bottom pit in accordance with the present invention.

Referring now to the drawings in detail, wherein like numerals indicate like elements, there is shown, as may be seen from FIGS. 1, 2, 3 and 4, taken together, an endless means or endless belt 10 in pit 100. Assuming that pit 100 has a width of approximately 30–40 feet, there would be a plurality of endless belts provided, preferably three or four, providing the pit 100 with a virtual live bottom. Since the structures of the endless belts are identical, they will be given identical numbers. However, it is understood that there may be one or more than one endless means or endless belt structure 10 in the pit. One preferred embodiment is to use four endless belts approximately 15 feet wide in a pit approximately 60 feet wide. The rear portion of a preferred embodiment of such a pit is shown in FIG. 15.

The endless means or endless belt 10 is comprised of plates 12 which are pivotally joined together at joints 14 by means of pins 16. The joints 14 are protected from solid waste and other matter falling into the joints by the overlapping curved portions 58 and 60 of the plates 12. The rear portion of each plate 12 is provided with a curved portion 58 which overlaps the forward curved portion 60 of the following plate 12. This protective means comprised of the curved portion 58 and 60 provides a significant advantage in preventing matter such as bolts, bars, plates and wire from falling into the joints when endless means 10 negotiates a curve such as by going around the sprocket wheels. The curved portions 58 and 60, in conjunction with the other structure of the live bottom, provide a substantially waterproof live bottom.

The endless means 10 which comprise the live bottom structure are supported by wheels 18 mounted on bars or axles 17. The wheels 18 are supported on tracks 20 and 22. Tracks 20 support the upper run of endless means 10 which carries most of the load. Tracks 22 support the return run of endless means 10.

Figure 2:
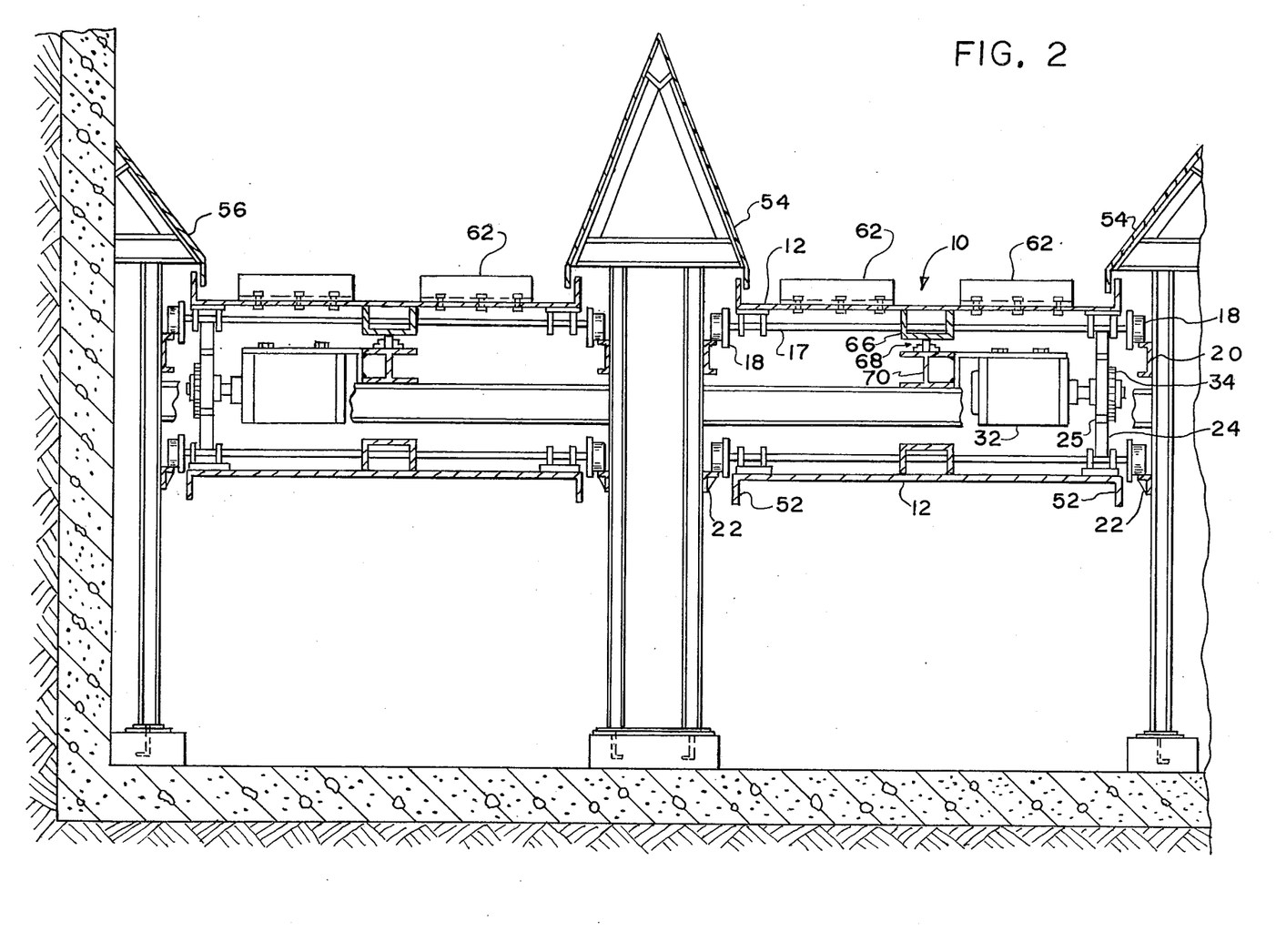
FIG. 2 is a cross sectional view of a portion of the structure of FIG. 1 taken along line 2—2.

As may be best seen from FIG. 2, additional support is provided to the center portion of plates 12 by means of members 66 mounted at the center of each plate 12. Members 66 are mounted on the inside surface of plates 12. Members 66 ride on rollers 68 supported on I beam members 70 providing additional support to the center of plates 12. Members 66 also provide an additional journaling structure for axles 17. However, it is understood that more than one such member 66 may be provided on the inside surface of each plate 12. For example, if the plates were wider, members 66 could be provided equally spaced along the width of plates 12. Of course, a roller 68 supported on a support means would be provided for each member 66.

Figure 3:
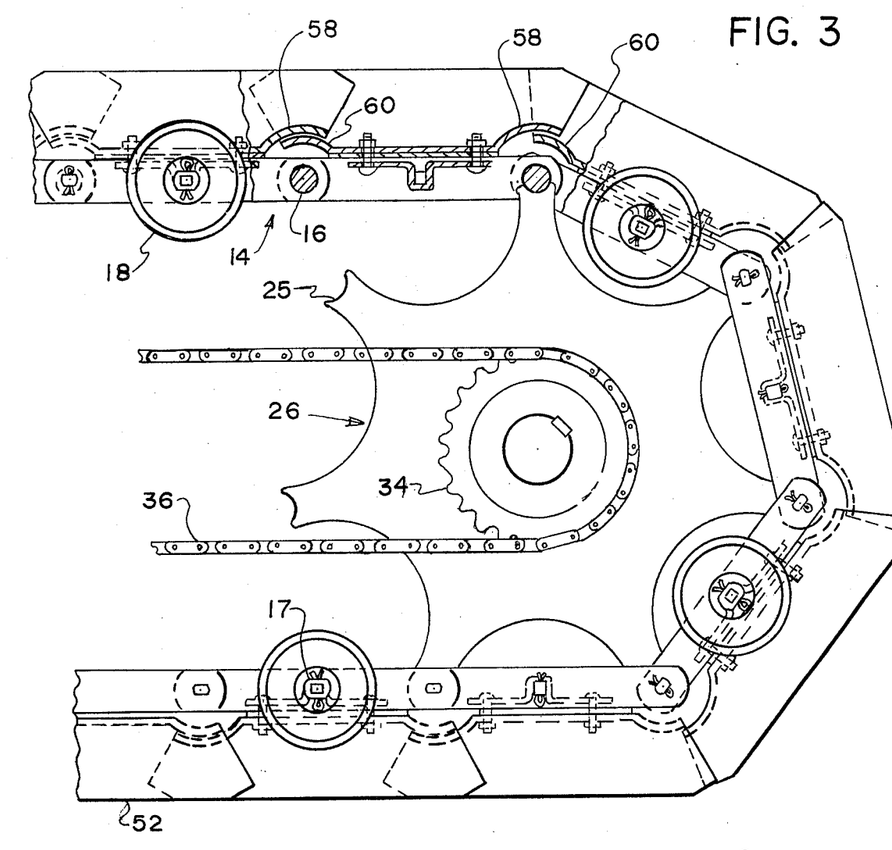
FIG. 3 is a side view, partially broken away to more clearly show the structure, of a portion of the endless means and a sprocket for driving the endless means in accordance with the present invention.
Figure 4:
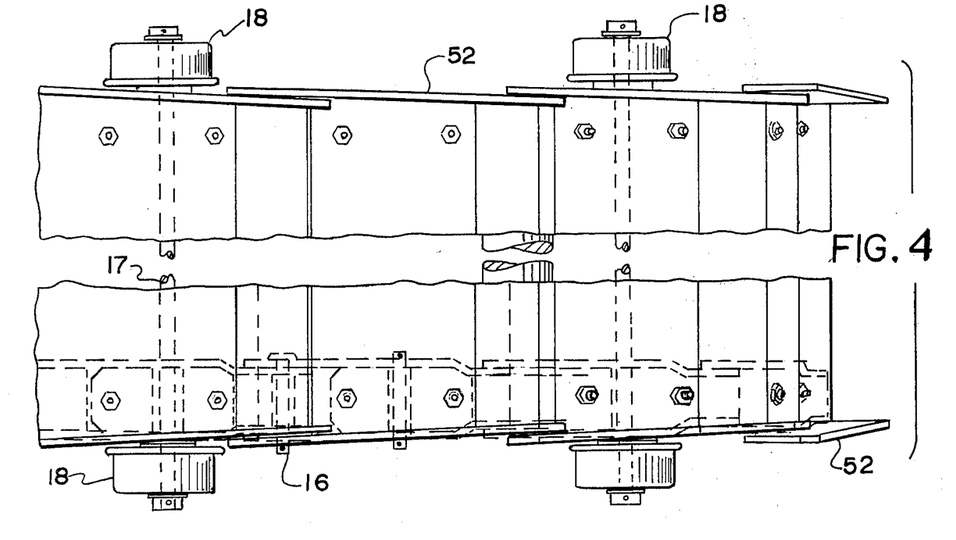
FIG. 4 is a plan view of a portion of the endless means shown in FIG. 3 in accordance with the present invention.

The endless means or endless belts 10 of the live bottom are driven by means of sprocket wheels 24, 26, 28 and 30. The teeth 25 of sprocket wheel 24 engage pins 16 of the joints 14 of endless means 10. A sideview of sprocket wheel 26 and a portion of a chain 36 riding on chain sprocket 34 used to link and synchronize sprocket wheels 24 and 26 are shown in FIG. 3. As may be seen from FIG. 1, the endless belt or endless means 10 is preferably driven at both ends by means of a pair of sprocket wheels. Sprocket wheels 24 and 26 drive the rear end of endless belt 10, and sprocket wheels 28 and 30 apply a driving force to the front or upper end of drive belt 10. The sprocket wheels may be driven hydraulically, pneumatically, electrically or by other suitable means. Preferably, hydraulic means are used to drive the sprocket wheels since greater forces may be applied with more accurate control.

As shown in FIGS. 2 and 3, motor 32 drives sprocket wheel 24 and chain sprocket 34 and chain 36. Sprocket wheels 28 and 30 are driven via motor 38 and chain drive 40. Motors 32 and 38 are preferably hydraulic motors which are synchronized with each other.

Figure 1:
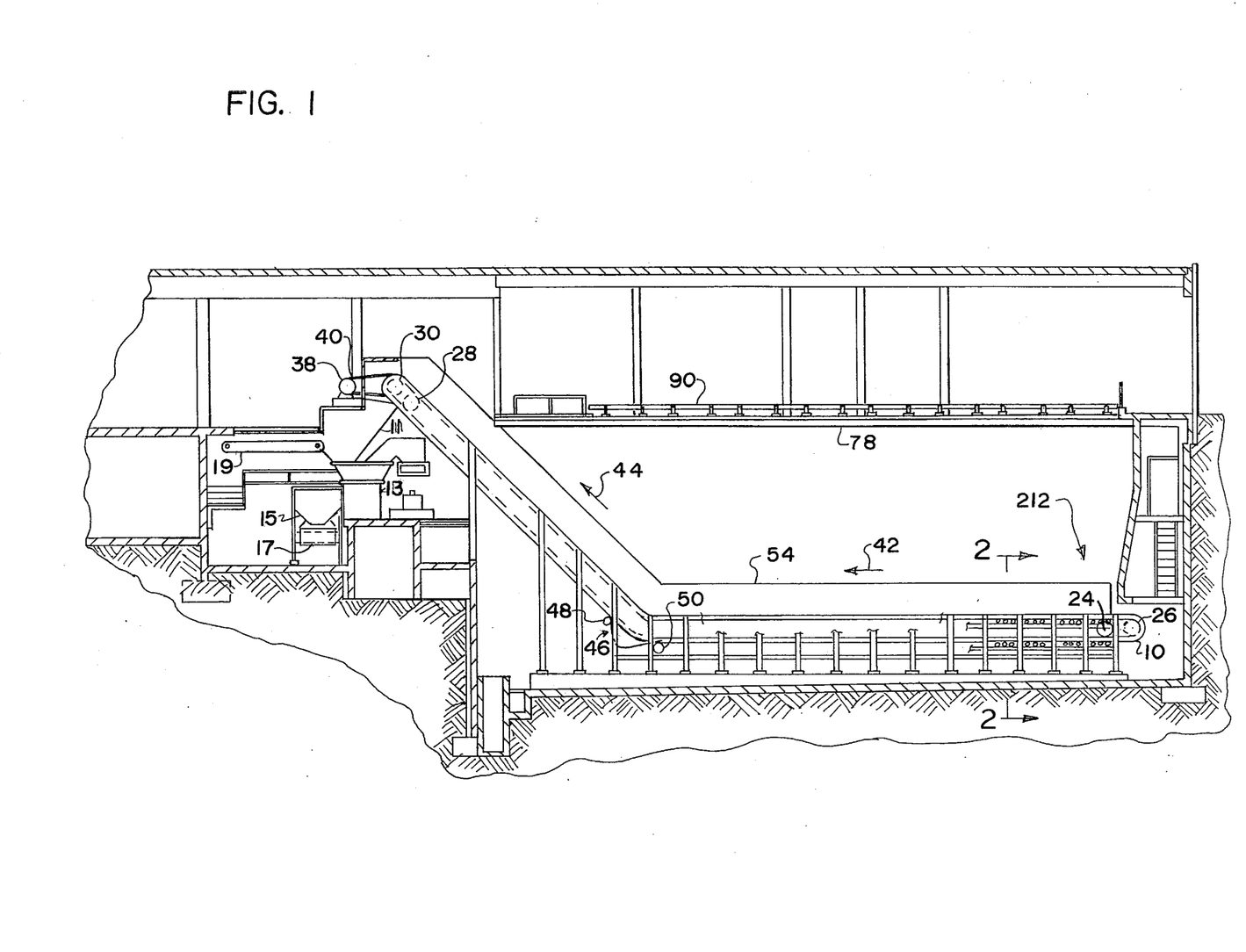
FIG. 1 is a side elevation view, partially in cross section, of the structure of the present invention with one side of the pit removed.

Sprocket wheels 24, 26, 28 and 30 drive the upper layer of endless belt 10 in the direction of arrows 42 and 44 as shown in FIG. 1. The direction of arrow 44 is preferably at an angle of 45° to arrrow 42. In other words, the inclined portion of endless means 10 is preferably positioned at an angle of 45°. However, the inclined portion of endless means 10 may be positioned at other suitable angles in excess of 35°. However, right angles which approach 90° will not provide satisfactory results and the angle is preferably less than 70°. The endless belt 10 is provided with a slack take - up at 46 by means of take-up rollers 48 and 50.

Figure 13:
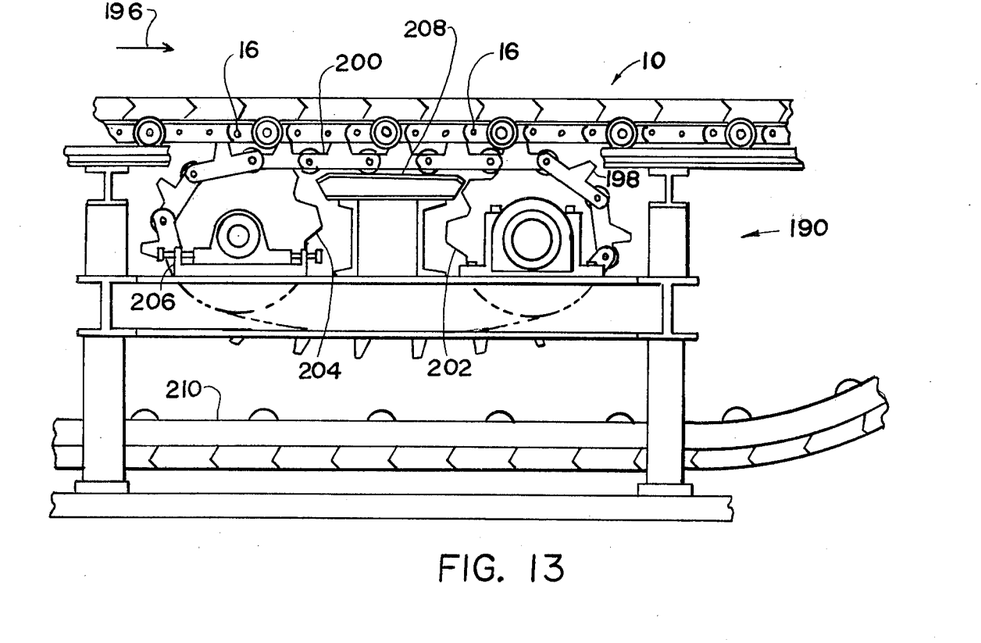
FIG. 13 is a side elevation view of an alternate embodiment of the present invention employing auxiliary means for driving the endless carrier means.
Figure 14:
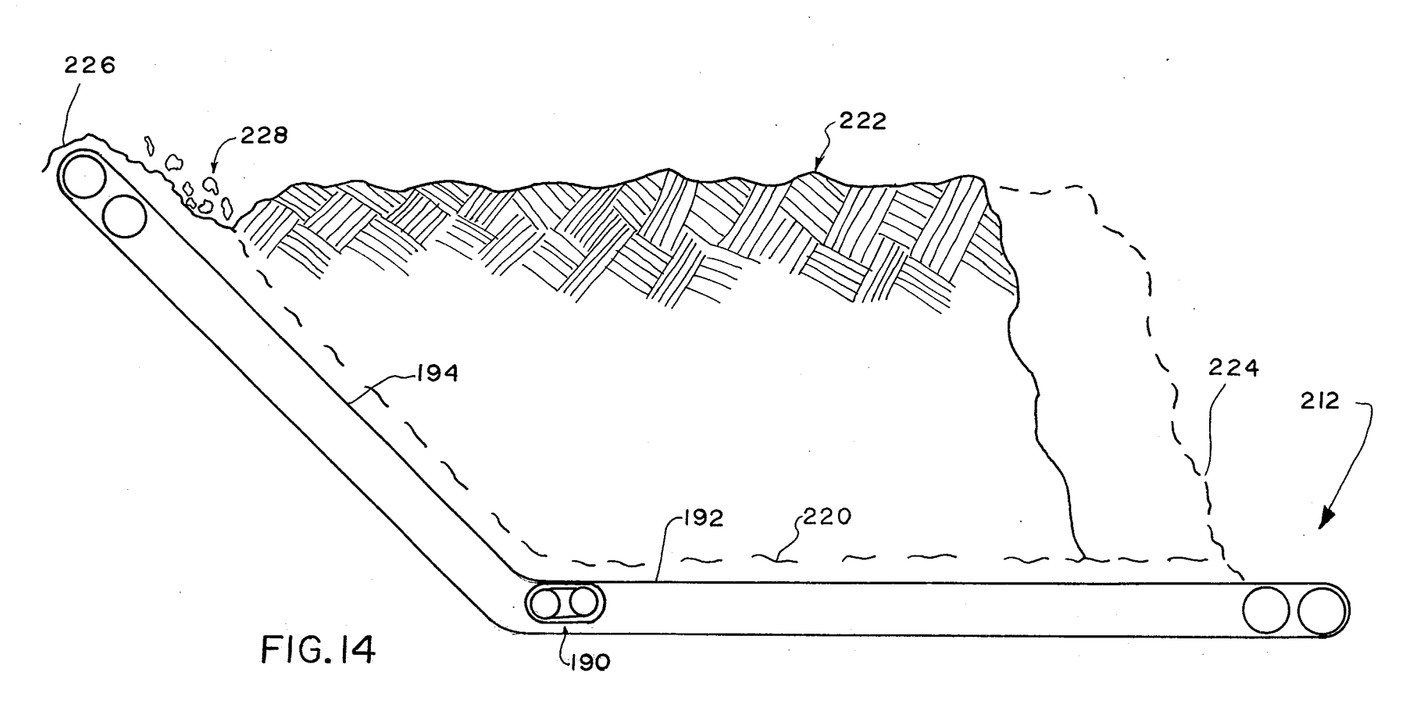
FIG. 14 is a diagram, in side elevation, illustrating the feeding of solid waste material in accordance with the present invention.

FIG. 13 is a side elevation view of an auxiliary drive means which may be located at a point intermediate the drive means located at each extreme of travel of endless means 10. Preferably, the auxiliary drive means 190 shown in FIG. 13 is located at a point on the horizontal portion 192 of endless means 10 near the beginning of the inclined portion 194 as shown in FIG. 14. The view of auxiliary drive means 190 shown in FIG. 13 is taken from the back side as shown in FIG. 14. Auxiliary drive means 90 may be used as required. Factors such as the width of plates 12 and the length of the horizontal portion 192 and the inclined portion 194 of the endless means, the depth of the pit, and the average loading of the endless means determine whether the auxiliary drive means will be used.

Referring now to FIG. 13 in greater detail, endless means or endless belt 10 is shown being driven in the direction of arrow 196. A driving force is applied to pins 16 via the projecting members 198 of chain 200. Chain 200 is driven by sprocket wheels 202 and 204. Sprocket wheel 204 is provided with an adjusting means 206 to remove slack from chain 200. A support means 208 is provided between sprocket wheels 202 and 204 to support chain 200. Auxiliary drive means 190 does not apply driving forces to the return portion 210 of endless means 10.

As shown in FIGS. 2, 3, 4, 5, 6 and others, the plates 12 of the endless means 10 are provided with side apron plates or side members 52 which retain the solid waste material on plates 12. The side apron plates 52 may be formed as an integral part of plate 12 or may be welded thereon. Side apron plates 52, as may be best seen in FIG. 2, ride or travel inside of skirts 54 and end skirts 56. The use of the upside-down V shaped skirts 54 and the end skirts 56 keep the solid waste material on the endless means or belt 10. Skirts 54 and 56 tend to support or cause the solid waste material to float to a certain degree above the live bottom. In other words, the full weight of solid waste material of a depth of 30 to 40 feet may not be resting on plates 12. In part, this weight will be supported by skirts 54 and 56. The skirts thereby tend to create hollow areas above the endless belt 10 that cave in toward the rear portion 212 causing the solid waste material in the rear to be fed first.

The plates 12 of the endless belt 10 are provided with overlapping curved end portions 58 and 60 which prevent material from falling between the plates in the joints 14. As may be seen in FIGS. 3 and 7, the rear curved portion 58 of one plate overlaps the succeeding forward curved portion 60 of the next plate 12. The overlapping curved end portions 58 and 60 of the plates 12 are very important in preventing material from falling into the joints when the endless means 10 is negotiating a curve such as travelling around sprocket wheel 26 as shown in FIG. 3. A hard piece of material, such as a piece of metal, falling into any joint 14 as the endless means 10 travels around a sprocket wheel may cause devastating effects when the joint tries to reclose on a straight portion of the belt travel. This problem is avoided by the overlapping curved portions 58 and 60. In addition, the curved portions 58 and 60 in conjunction with the side apron plates 52 of the endless belt provide a substantially waterproof live bottom.

Figure 5:
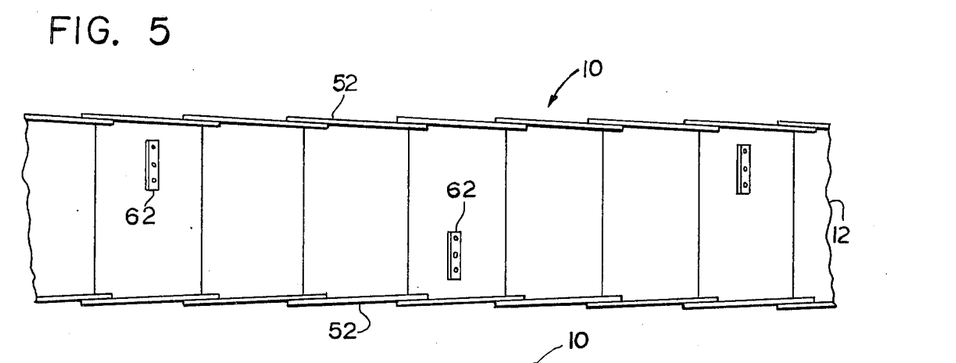
FIG. 5 is a plan view of one embodiment of projecting members or cleats mounted on the plates of the endless means.
Figures 6, 7:
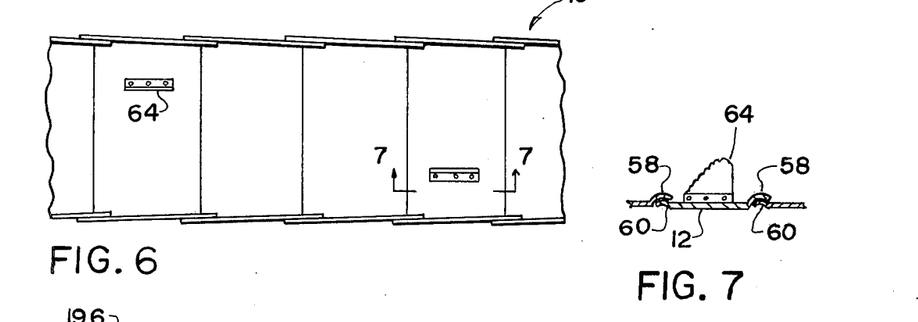
FIG. 6 is a plan view of another embodiment of projecting members or cleats mounted on the plates of the endless means in accordance with the present invention.
FIG. 7 is a side elevation view, partially in cross section, taken along line 7—7, of a projecting member or cleat used in the embodiment of FIG. 6 in accordance with the present invention.

The plates 12 may be provided with projecting members or cleats 62 as shown in FIGS. 2 and 5. An alternate embodiment of the projecting members or cleats is shown in FIGS. 6 and 7. In FIGS. 5 and 7, the projecting members or cleats 64 are mounted parallel to the direction of motion of the endless belt 10 whereas the projecting members or cleats 62, as shown in FIGS. 2 and 5, are mounted perpendicular to the direction of movement of endless belt 10. The mounting of projection members or cleats 64 parallel to the direction of movement of endless belt 10 has been found to be preferable. The mounting of projecting members 64 parallel to the movement of belt 10 provides a slicing or cutting action which produces a more effective shredding action of the solid waste material.

Figure 8:
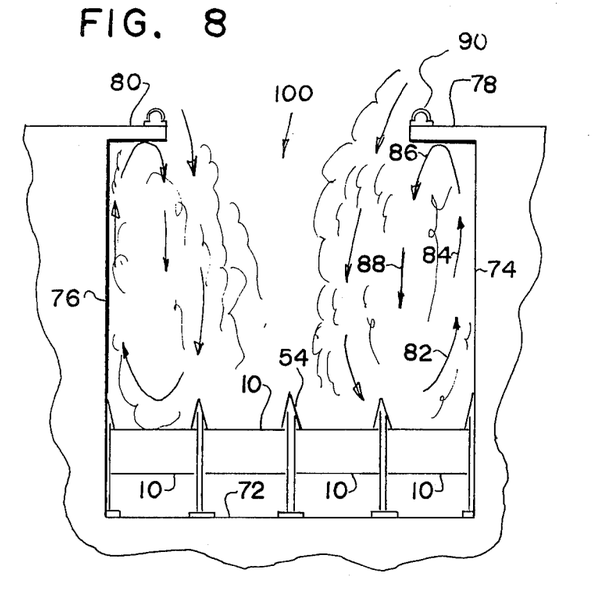
FIG. 8 is an elevation view of the structure of the pit illustrating the dust and dirt retaining means provided in accordance with the present invention.

Referring now to FIGS. 1 and 8, there is shown the structure of pit 100 for preventing the efflux of dust and dirt during the dumping of solid waste into the pit. This is especially important where the solid waste contains ashes and cinders which are commonly picked up in the collection of garbage. The pit is comprised of a floor 72 and a pair of opposed sidewalls 74 and 76, all preferably made of concrete. The opposed sides or sidewalls 74 and 76 are provided with cantilevered projections 78 and 80, respectively, at their upper ends.

Referring to FIG. 8, as garbage and trash containing ashes and other dirt is dumped into 100 from a vehicle dumping from cantilevered projection 78, the dust caused by the dumping action tends to travel upward along wall 74 as shown by arrows 82 and 84. The presence of cantilevered projection or cantilever 78 thwarts the efflux of the dust as shown by arrow 86 causing it to flow back into pit 100 as shown by arrow 88.

Referring now to FIGS. 1, 8, 9, 10, 11 and 12, there are shown stops 90 for preventing trucks or other vehicles from entering the pit 100. Stop 90 is shown mounted on cantilever 78 and is shown in detail in FIGS. 11 and 12. The stop 90 is comprised of a rotatable cylindrical member 92 having an axle 94 passing therethrough. Axle 94 is preferably mounted in supports 96 and 98 with cylinder 92 rotating on axle 94 for the convenience of mounting the specific alarm structure which will be discussed hereinafter. However, it is clear that the cylindrical member 92 may be rigidly mounted to axle 94 with axle 94 being journaled for rotation in support members 96 and 98.

Figures 10, 11, 12:
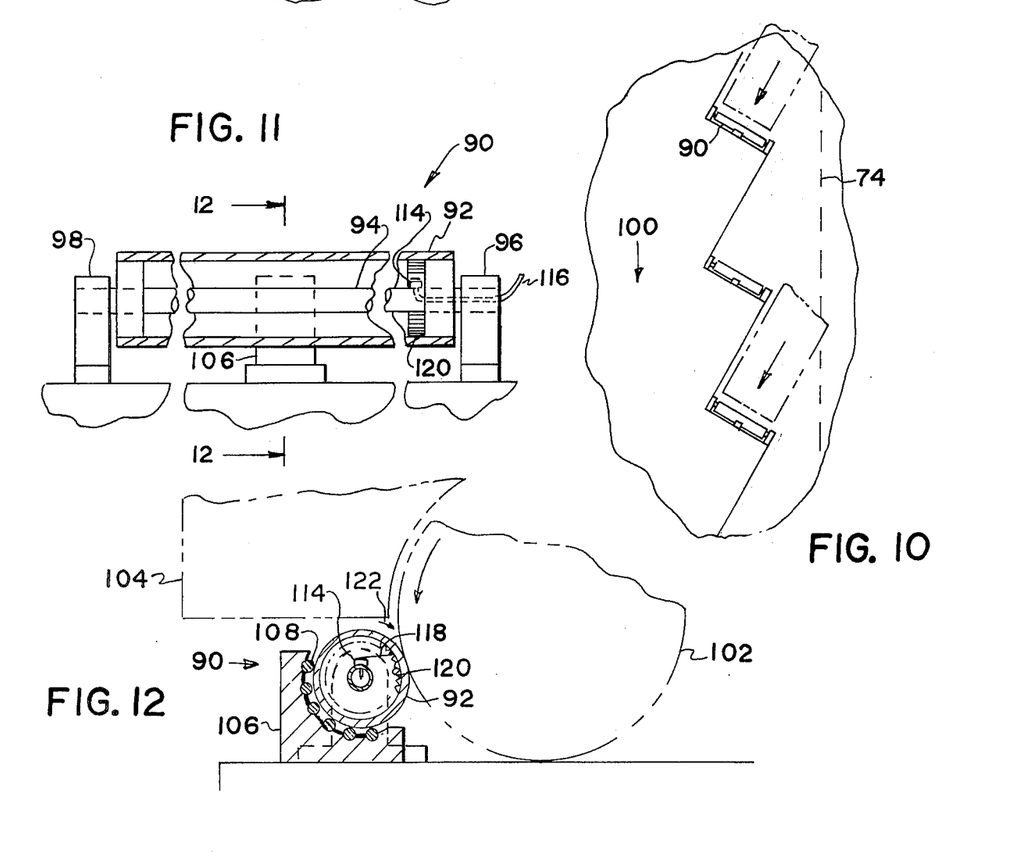
FIG. 10 is a plan view of another embodiment of the dust and dirt retaining means and the truck stop means of the present invention.
FIG. 11 is a cross sectional view of the truck stop means taken along line 11—11 of FIG. 9.
FIG. 12 is a cross sectional view of the truck stop means of the present invention taken along line 12—12 of FIG. 11.

In the past, square sills or even pipes have been mounted to stop the back wheels of the trucks as they are backed up to the edge of the pit 100. However, a sill of a rectangular crosssection is not a very effective stopping means since the back wheels are the driving or powered wheels of the truck or vehicle and they tend to dig into the edge of the sill and ride up and over the sill. A pipe is but a little more effective in stopping the rear wheels of the vehicle. Furthermore, the overhang of the truck bodies on trash collection vehicles is customarily very low as illustrated in FIG. 12. Therefore, it is essential that the stop 90 be as low as possible to prevent contact with the truck box, but as high as possible to provide the greatest effective stopping capability. Furthermore, it is highly desirable that the stop be so constructed that garbage and trash may be swept underneath the stop 90 into pit 100. A rear tire 102 and the body or box 104 of a truck having a low overhanging are illustrated in FIG. 12.

The conventional trash collection truck is a large and heavy vehicle. Therefore, in many cases, it is desirable to support the center of rotatable cylindrical member 92. However, due to the low overhang of the truck bodies 104, a support member cannot surround cylindrical member 92. Center support member 106 is provided to support the center of cylindrical member 92. As may be seen in FIG. 12, bearings 108 are provided. Bearings 108 may be either ball bearings or roller bar bearings for providing support to the center of cylindrical member 92 while allowing member 92 to rotate.

Figure 9:
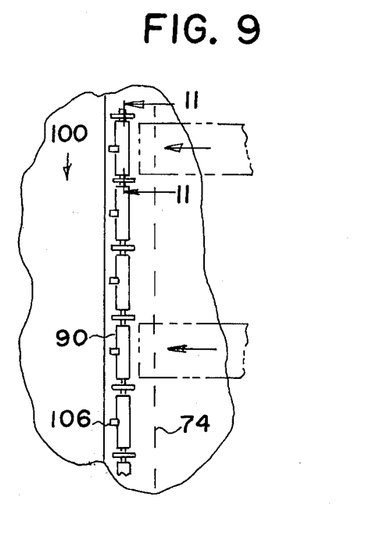
FIG. 9 is a plan view of one embodiment of the dust and dirt retaining means and truck stop means of the present invention.

Referring now to FIGS. 9 and 10, there are shown two embodiments of the cantilevered projections 78 and 80. FIG. 9 illustrates an embodiment wherein the trucks or other vehicles are backed to the pit 100 at an angle of 90° to the edge or sidewall 74 of the pit and are stopped by stops 90. FIG. 10 illustrates an embodiment of the cantilevered projection for preventing dust flow out of the pit 100 wherein the trucks or other vehicles may back up to pit 100 at an acute angle to the edge or sidewall 74 of the pit. Stops 90 are also provided to prevent vehicles from backing into the pit. In both the embodiments of FIGS. 9 and 10, there is a substantial overhang of the cantilever from sidewall 74 at all points, thereby preventing dust flow out of the pit during dumping.

Figure 17:
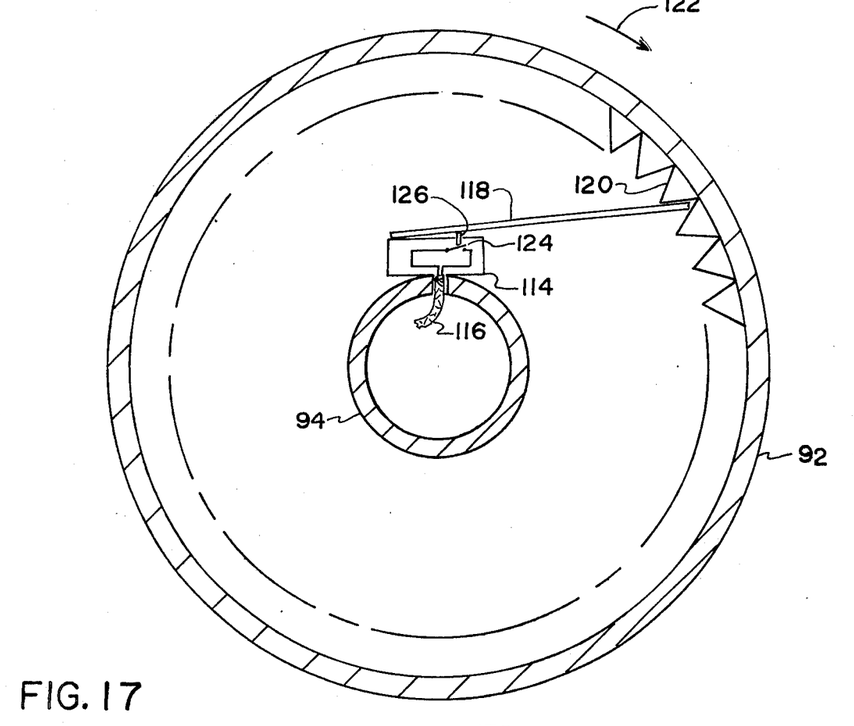
FIG. 17 is an enlarged cross sectional view, partially diagramatic, of the microswitch mechanism of FIG. 12 in accordance with the present invention.

The stop means 90 is preferably provided with a means for providing an audible and/or visible alarm when the tires of a vehicle contact cylindrical member 92 causing it to rotate. The amount of rotation may be very minimal to energize the alarm. The alarm structure and circuitry are shown in FIGS. 11, 12, 17 and 18. The alarm includes a microswitch 114 mounted on axle 94 which is preferably hollow, such as a pipe. Axle 94, in any event, is provided with a passageway enabling the passage of electrical cable 116. Microswitch 114, as may be seen in FIGS. 12 and 17, is provided with a microswitch arm 118. Arm 118 of microswitch 114 contacts teeth 120 which are provided on the inner surface of cylindrical member 92.

Figure 18:
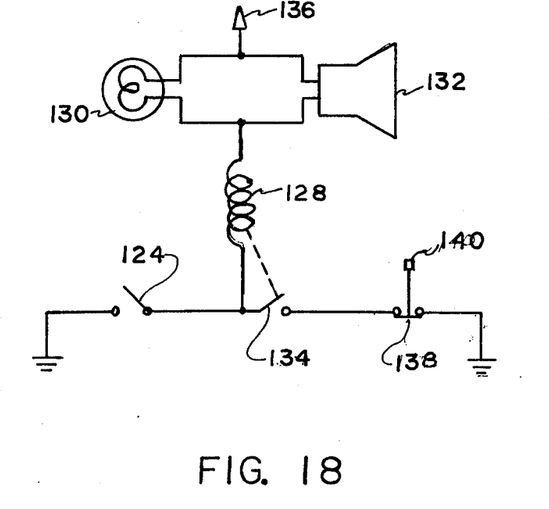
FIG. 18 is a schematic diagram of a stop alarm in accordance with the present invention.

Referring particularly now to FIGS. 17 and 18, the rotation of cylindrical member 92 in the direction of arrow 122 causes microswitch 118 to be depressed each time a tooth traverses the end of the microswithch 118. Depression of arm 118 causes the momentary closing of switch contacts 124 via member 126.

Microswitch contacts 124 are shown in FIG. 18. Microswitch contacts 124 are shown connected in series with relay holding coil 128 and the parallel combination of warning light 130 and audible alarm 132 between a source of electrical power 136 and ground. The microswitch contacts 124 are normally open. The momentary closing of contacts 124 by rotation of cylindrical member 92 causes relay holding coil 128, warning light 130 and audible alarm 132 to be energized. The energization of relay holding coil 128 causes normally open contacts 134 to be closed. The closing of contacts 134 causes relay coil 128, audible alarm 132 and warning light 130 to remain energized via normally closed reset contacts 138. The power supply 136 may be any suitable source of electric power such as an AC line supply.

Once the truck has dumped its load into pit 100, the reset switch 138 may be depressed, de-energizing the warning circuitry. The reset switch 138 may be depressed manually or by truck tires running over a switch lever 140 mounted in the roadbed, a predetermined distance from the edge of the pit. The truck tire of a truck pulling away from pit 100 and running over the switch lever may be used to momentarily open switch contacts 138, thereby resetting the alarm circuitry.

Figure 16:
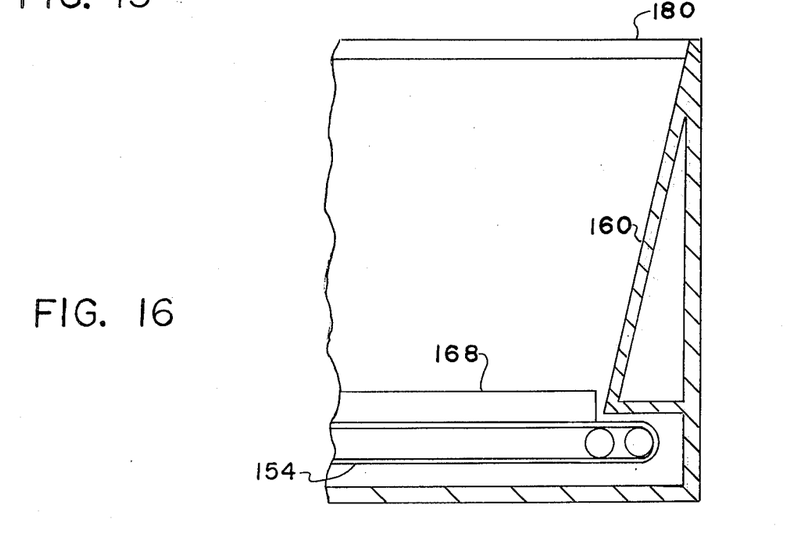
FIG. 16 is a partial cross sectional diagramatic view taken along line 16—16 in FIG. 15.

Another embodiment of a live bottom pit for a solid waste disposal system is shown in FIGS. 15 and 16. This embodiment is preferably adapted for use where the pit is required to be very large. This, for example, may be desirable in large urban areas. Referring now to FIGS. 15 and 16, there are shown the rear portions of endless carriers 152, 154, 156, and 158. The two center endless carriers extend rearward to a greater extent than the two outer endless carriers 156 and 158. The rear walls 160, 162 and 164 are sloped outwardly to project over the rearwardmost end of endless carriers 152, 154, 156 and 158. With respect to rear wall 160, this may be seen best in FIG. 16. As may be seen in FIG. 16, rear wall 160 extends out over the end of endless carrier or means 154.

Much of the structure of the embodiment shown in FIGS. 15 and 16 may be similar to that of the embodiment shown in FIG. 1. Upside-down V skirts 166, 168 and 170 are provided between endless carriers 156, 152, 154 and 158, respectively. End skirts 172, 174, 176 and 178 are provided along the sidewalls. Cantilever projections 180 and 182 are provided at the upper ends of the sidewalls of the rearward-most portion of live bottom pit 150. The cantilever projections 180 and 182 prevent the outflow of dust and dirt during the dumping of solid waste into the pit. In a similar manner, sawtooth cantilever projections are provided projecting from the sidewalls 186 and 188 as shown along one side of the pit at 184. The cantilever projection extending from sidewall 188 is broken away.

One of the significant advantages of the embodiment shown in FIGS. 15 and 16 is that it enables the distribution of solid waste throughout the pit even though the pit may be very wide. For example, trucks dumping from the cantilever projections of sidewalls 186 and 188 may be used to fill the side portions of live bottom pit 150. Trucks dumping from cantilever projections 180 and 182 may be used to fill the center portion of live bottom 150. This provides a relatively even filling of the full width of the pit, even though the pit is extremely wide to handle a very large volume of solid waste material.

Referring now to FIG. 14, the live bottom pits of the present invention, both as exemplified by live bottom pit 100 and 150, operate by moving a layer of mass 220 along the endless means as shown in FIG. 14. This layer of mass 220 is shredded in part off of the bottom of mass 222 and in part is fed from the rear 224 of the solid waste mass 222. This action tends to cause a feeding in a measured amount along the endless means. This measured amount is fed along the horizontal portion 192 and up the inclined portion 194. The measured amount is fed over the top 226 of the endless means in a measured amount for further processing. Larger and heavier particles, especially articles such as heavy metallic objects and automobile tires, tend to fall back as shown at 228. These may be conveniently picked out of the live bottom pit at this point. The mass 222 is fed in measured amounts from the rear of the pile. This effectively causes the mass always to be in the forward end of the live bottom pit. This also causes a tremendous pressure to be applied against the layer of material being fed up along the inclined porton 194. This pressure on the layer of material being fed causes the material to be broken and crumbled, which forms a part of the processing of the solid waste material.

The broken and crumbled layer of material fed over the top 226 of the endless means is fed to pulverize 13 via hopper 11 as shown in FIG. 1. Pulverizer 13 pulverizes the crumbled solid waste material for use as fuel in the generation of steam. The steam may be used for heating purposes or to generate electricity. The pulverized material is carried from pulverizer 13 via hopper 15 and conveyor belt 17. Conveyor belt 19 is used to feed waste lumber into pulverizer 13.

It will be apparent to those skilled in the art that various modifications may be made to the structure and operation of the live bottom pit within the spirit and teachings of the present invention. For example, various changes may be made in the structure of the endless means, and the means for driving the endless means or endless belt. Various other changes may be made in the detailed structure.

In view of the above, the present invention may be embodied in other specific forms without departing from the spirit or essential attributes thereof and, accordingly, reference should be made to the appended claims, rather than to the foregoing specification as indicating the scope of the invention.

I claim:

1. In a solid waste disposal system, a pit for the collection of solid waste to be incinerated, said pit comprising:
   a pair of opposed walls and a bottom therebetween;
   a plurality of endless means positioned between said opposed walls, a first portion of said plurality of endless means being positioned in a substantially horizontal position near at least a portion of the bottom of said pit for forming a live or moving bottom for the pit and a second portion of said plurality of endless means extending inclined upwardly at an angle in excess of 35° and out of said pit; and
   means for driving said endless means to remove a layer of solid waste adjacent said endless means from the bottom of a mass of solid waste in the pit.

2. A pit in a solid waste disposal system in accordance with claim 1 wherein said endless means comprises a plurality of plates joined together by pivotal joint means.

3. A pit in a solid waste disposal system in accordance with claim 2 wherein at least a predetermined number of said plurality of plates are provided on their outer surface with projecting members.

4. A pit in a solid waste disposal system in accordance with claim 3 wherein said projecting members are positioned perpendicular to the direction of movement of the endless means.

5. Apparatus in accordance with claim 3 wherein said projecting members are positioned parallel to the direction of movement of the endless means.

6. A pit on a solid waste disposal system in accordance with claim 2 wherein said plurality of plates are provided with curved portions for overlapping said pivotal joint means thereby preventing the passage of material between said plates at the joints.

7. A pit in a solid waste disposal system in accordance with claim 2 wherein predetermined ones of said plurality of plates include axle means mounted in a supporting relationship and each of said axle means being provided with a wheel at each end and a track means for the wheels on each end.

8. A pit in a solid waste disposal system in accordance with claim 2 wherein each of said plurality of plates is provided with a substantially vertical side member on each side.

9. A pit in a solid waste disposal system in accordance with claim 1 wherein said drive means comprises at least one sprocket drive means at each extreme of said endless means and an auxiliary drive means positioned between said sprocket drive means, said auxiliary drive means including two sprocket wheels and a chain driven by said two sprocket wheels, said chain engaging and driving said endless means.

10. In a solid waste disposal plant, a live bottom pit comprising:
    a pit having at least two opposed sides and a bottom, said opposed sides having at their upper ends cantilever projections thereon, said cantilever projections being located at the floor level of the plant for enabling solid waste carrying vehicles to dump into the pit and for substantially reducing dust flow from the pit during dumping;
    a plurality of endless carrier means extending substantially along the bottom of said pit and rising inclined upwardly at an angle in excess of 35 degrees at the end of said pit between said opposed sides, said endless carrier means being comprised of a plurality of plates joined together by pivotal joint means with each of said plurality of plates being provided with a substantially vertical side member on each side;
    skirt means mounted between said plurality of endless means, said shirt means being comprised of an upsidedown v-shaped structure, the lower ends of said upsidedown v-shaped structure extending inside the side members of adjacent endless carrier means; and
    means for driving said plurality of endless carrier means whereby a layer of solid waste adjacent said endless carrier means may be removed from the bottom of a mass of solid waste in the pit.

11. A pit in a solid waste disposal plant in accordance with claim 10 wherein at least a predetermined number of said plurality of plates are provided on their outer surface with projecting members.

12. A pit in a solid waste disposal plant in accordance with claim 11 wherein said projecting members are positioned perpendicular to the direction of movement of the endless carrier means.

13. A pit in a solid waste disposal plant in accordance with claim 11 wherein said projecting members are positioned parallel to the direction of movement of the endless carrier means.

14. A pit in a solid waste disposal plant in accordance with claim 10 wherein said plurality of plates are provided with curved portions for overlapping said pivotal joint means thereby preventing the passage of material between said plates and the joints.

15. A pit in a solid waste disposal plant in accordance with claim 10 wherein predetermined ones of said plurality of plates of said endless carrier means include axle means mounted in a supporting relationship and each of said axle means being provided with a wheel at each end and a track means for the wheels on each end.

16. A pit in a solid waste disposal plant in accordance with claim 10 wherein said drive means comprises at least one sprocket drive means at each extreme of said endless carrier means and auxiliary drive means positioned between said sprocket drive means, said auxiliary drive means including two sprocket wheels and a chain driven by said two sprocket wheels, said chain engaging and driving said endless drive means.

17. A pit in a solid waste disposal plant in accordance with claim 10 wherein said cantilever projections extend a predetermined uniform distance from the opposed sides.

18. A pit in a solid waste disposal plant in accordance with claim 10 wherein said cantilever projections are sawtooth shaped to enable the dumping of vehicles into said pit at an acute angle.

19. A pit in a solid waste disposal plant in accordance with claim 10 wherein said cantilever projections are provided with stop means, said stop means comprising a rotatably mounted cylindrical member mounted substantially perpendicular to the approach path of vehicles carrying solid waste material.

20. A pit in a solid waste disposal plant in accordance with claim 19 wherein said stop means includes at least one support member mounted between the ends of said cylindrical member, said support member supporting a portion of the lower and pit sides of the cylindrical member and extending upward not in excess of the top of said cylindrical element.

21. A pit in a solid waste disposal plant in accordance with claim 10 including at least three endless carriers, said at least three endless carriers being mounted in parallel adjacent each other, at least one center endless carrier extending rearward to a greater distance than the two outer endless carriers, and a second set of opposed walls forming the sides of the pit for the length of extension of said center endless carrier.

22. A pit in a solid waste disposal plant in accordance with claim 21 wherein opposed walls of said second set of opposed walls are provided at their upper ends with cantilever projections thereon.

* * * * *